United States Patent [19]

Yoshida

[11] Patent Number: 4,821,984
[45] Date of Patent: Apr. 18, 1989

[54] SAFETY CHAMBER FOR AN AIRPLANE

[76] Inventor: Tokuichiro Yoshida, 13-14,Ise-cho, Kawasaki-shi, Japan

[21] Appl. No.: 174,416

[22] Filed: Mar. 25, 1988

[30] Foreign Application Priority Data

Mar. 27, 1987 [JP] Japan ............................. 62-75662

[51] Int. Cl.$^4$ ..................... B64D 25/00; B64D 25/08
[52] U.S. Cl. ............................ 244/141; 244/138 R; 244/121
[58] Field of Search .................. 244/138 R, 139, 140, 244/141, 121

[56] References Cited

U.S. PATENT DOCUMENTS

| 2,693,923 | 11/1954 | Bigio | 244/140 |
| 2,733,027 | 1/1956 | Gero | 244/140 |
| 2,806,666 | 9/1957 | Brown et al. | 244/140 |
| 2,984,211 | 5/1961 | Schneider | 244/140 |
| 3,294,346 | 12/1966 | Summers | 244/121 |

Primary Examiner—Joseph F. Peters, Jr.
Assistant Examiner—Rodney Corl
Attorney, Agent, or Firm—Holman & Stern

[57] ABSTRACT

A safety chamber of the telescopic type usable for an airplane includes a plurality of wall segments, granular cushioning materials and a parachute. As long as it is not in use, the wall segments are accommodated in a contracted state in the space on the ceiling of the airplace. In the event of an occurrence of emergency the wall segments are lowered one after another to constitute a chamber in which a single seat assembly is incased together with passengers sitting thereon. When the lowermost wall segment reaches the floor of the airplace, a plurality of hooks around the lower edge thereof are engaged with recessed parts on the bottom of the seat assembly and at the same time the cushioning materials fall down from the ceiling while expanding by themselves whereby the hollow space in the expanded chamber surrounding the passengers is filled with cushioning materials for the purpose of preventing the passengers from the influence of shocks. In the extreme case where the airplane is broken into plural pieces, the safety chambers are thrown away from the airplane while a parachute on each of the safety chambers is unfolded and opened during falling-down of the safety chamber. Thus, each of the safety chambers lands on the ground or sea surface safely.

5 Claims, 7 Drawing Sheets

7

4,821,984

SAFETY CHAMBER FOR AN AIRPLANE

BACKGROUND OF THE INVENTION

The present invention relates to a safety chamber for an airplane and more particularly to a safety chamber of the telescopical type usable for an airplane.

Tragic trouble relative to airplanes takes place sometimes in a year. As far as a passenger airplane is concerned, it is not equipped with escaping apparatuses but it is usually provided with safety belts and safety vests. As is well known, however, such safety belts and safety vests do not function as completely safe means particularly in such an extreme case where the body of an airplane is broken in plural pieces.

SUMMARY OF THE INVENTION

The present invention has been made with the foregoing background in mind and its object resides in providing a safety chamber which serves as passenger rescue means for a passenger airplace in such an extreme case where the body of the airplane is broken into plural pieces due to an unexpected occurrence of explosion or the like reason.

To accomplish the above object there is provided according to the present invention a safety chamber of the telescopic type usable for an airplane comprising a plurality of wall segments adapted to be telescopically displaced relative to one another to assume a contracted state when it is not in use and an expanded state when it is in use, the wall segments constituting a chamber in the expanded state in which a single seat assembly is completely incased together with passengers sitting thereon in the event of an occurrence of emergency and the lowermost wall segment having the same dimensions as those of the bottom of the seat assembly, a large number of granular cushioning materials for protecting the passengers on the seat assembly from the influence of shock caused when it lands on the ground or sea surface, the cushioning materials being stored in a compressed state in the contracted wall segments on the ceiling of the airplane when it is not in use and they falling down from the ceiling while expanding by themselves in the event of an occurrence of emergency so that the hollow space in the expanded chamber surrounding all passengers being filled with them, and a parachute stored in a parachute box on the uppermost wall segment.

The lowermost wall segment is provided with a plurality of engagement means around the bottom edge thereof which are engaged with the bottom of the seat assembly when it is lowered on the floor of the airplane.

Preferably, the engagement means comprises a hook which is adapted to be engaged with a recessed part on the bottom of the seat assembly.

In order to inhibit each of the wall segments to be disconnected from the adjacent one, it is appreciably tapered downwardly.

The cushioning materials are stored in the space in the contracted wall segments with the use of a film or the like material which is broken or torn when the safety chamber is in use in the event of an occurrence of emergency.

So as to allow the safety chamber to be disengaged from the ceiling of the airplane in the event of an occurrence of emergency, the safety chamber is provided with unlocking means and switching means which are automatically actuated at that time.

Other objects, features and advantages of the present invention will become readily apparent from reading of the following description which has been prepared in conjunction with the accompanying drawings.

BRIEF DESCRIPTION OF THE DRAWINGS

The present invention will be illustrated in the following drawings in which;

FIG. 3 is a cross-sectional plan view of the safety chamber in FIG. 2.

DESCRIPTION OF THE PREFERRED EMBODIMENT

Now, the present invention will be described in a greater detail hereunder with reference to the accompanying drawings which illustrate a preferred embodiment thereof.

Figure 1:
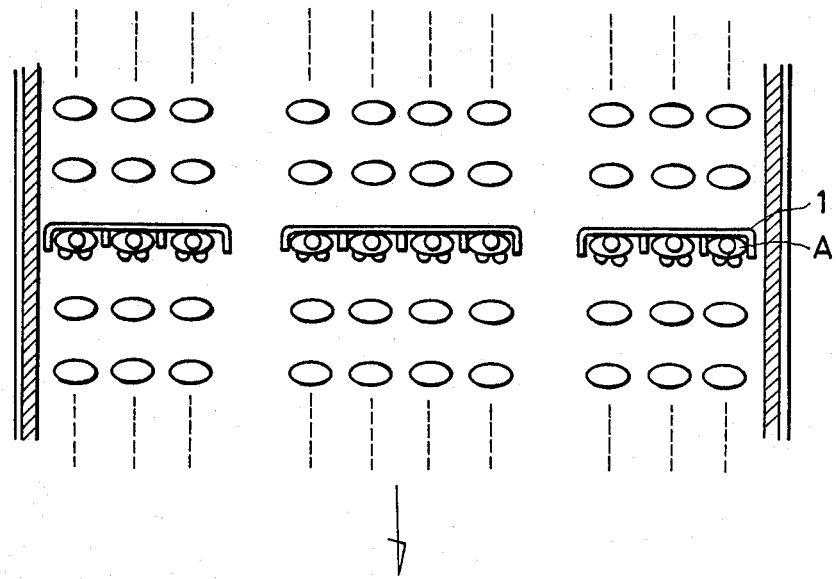
FIG. 1 is a fragmental plan view of the interior of an airplane.
Figure 2:
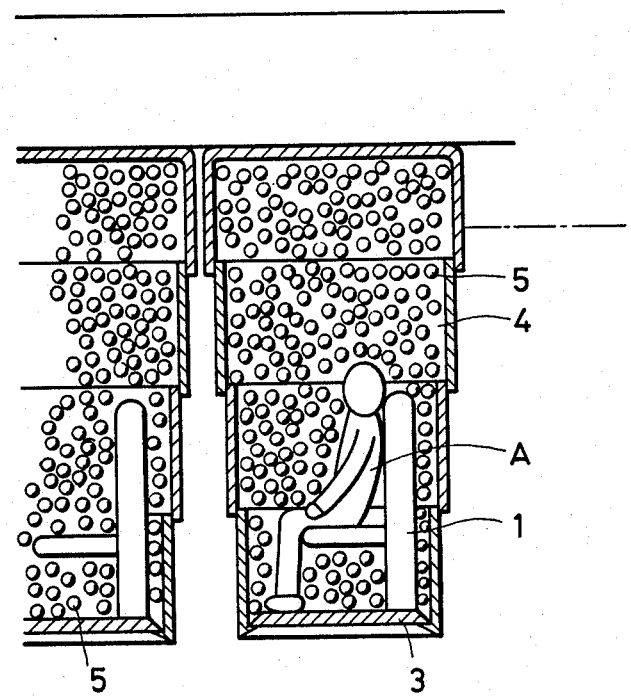
Figure 3:
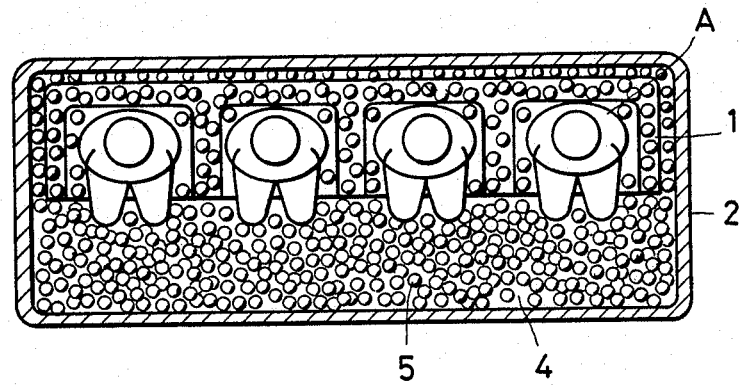
FIG. 3 is a vertical sectional view of a safety chamber in an expanded state, wherein the safety chamber comprises four wall segments.
Figure 5:
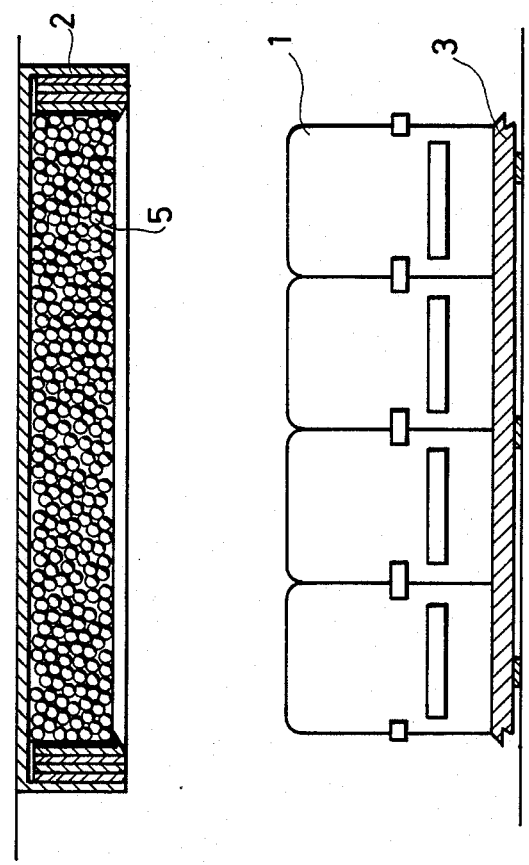
FIG. 5 is a vertical sectional view of the safety chamber in a contracted state, particularly illustrating that a large number of granular cushioning materials are stored in the interior of the safety chamber in a compressed state on the ceiling of the airplane.
Figure 6:
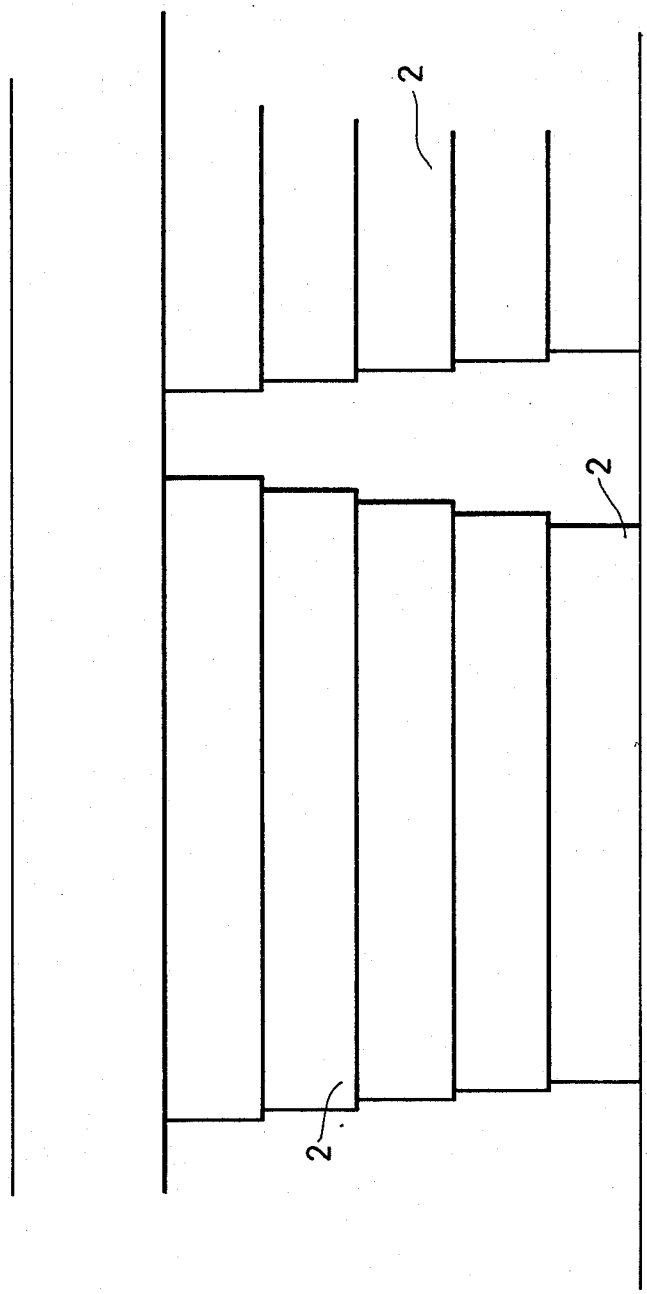
FIG. 6 is a front view of the safety chamber in the expanded state.

In FIG. 1 reference numeral 1 designates a seat assembly for three passengers A. As will be apparent from FIGS. 2 and 6, the safety chamber of the invention is constructed in a telescopic structure comprising a plurality of wall segments 2 Specifically, the safety chamber includes four wall segments 2 in the illustrated embodiment and as shown in FIG. 5, it is normally accommodated in a contracted state in a case which is fixedly secured to the ceiling of an airplane. As is best seen in FIG. 5, the lowermost wall segment 2 is provided with a plurality of hooks along the lower edge thereof. The hooks are adapted to come in engagement with recessed parts on the bottom of the seat assembly when the safety chamber is in use as described later.

Figure 4:
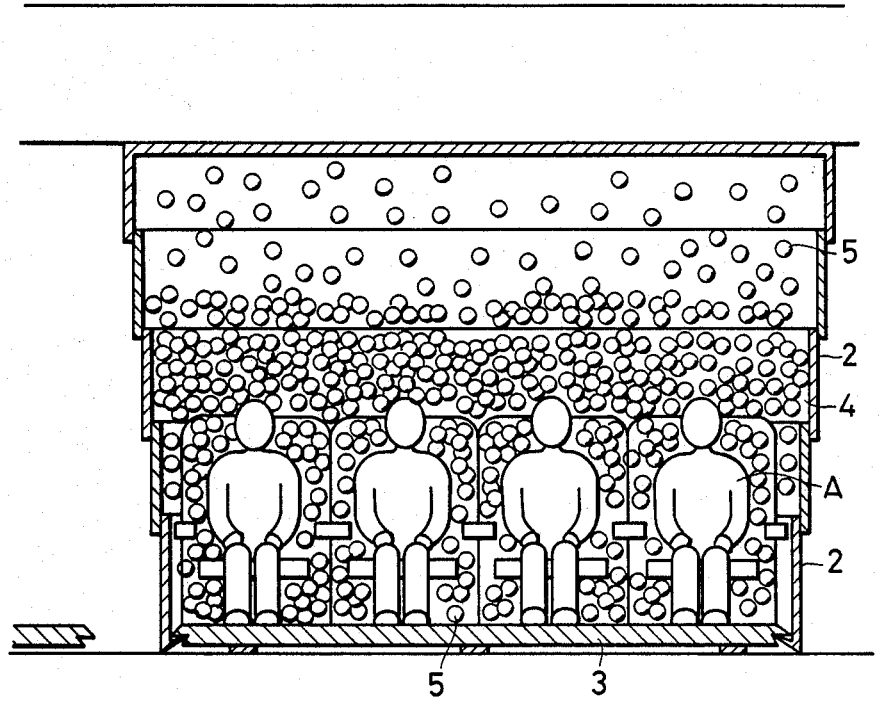
FIG. 4 is a sectional front view of the safety chamber in FIG. 2.

When some trouble takes place with the airplane and therefore all passengers in the airplane should be ready to leave there safely, the safety chamber becomes operative in such a manner that the four wall segments 2 are released from the contracted state and thereby they are lowered one after another from the case on the ceiling. When the lowermost wall segment 2 reaches the floor of the airplane, the hooks disposed along the lower edge thereof are brought in engagement with the recessed parts on the bottom plate 3 of the seat assembly 1 whereby a chamber 4 is formed in which the seat assembly 1 is incased together with passengers. To prevent the wall segment from being disconnected from the adjacent one, each of the wall segments 2 is appreciably tapered downward. FIG. 4 shows the case where four passengers are incased in the chamber 4 of the safety chamber of the invention in an expanded state.

As will be apparent from the drawings, the safety chamber includes a large number of granular cushioning materials 5. As long as the airplane flys without any trouble, the cushioning materials 5 are held in a compressed state in a space on the ceiling with the use of a film, sheet or the like material. When the safety chamber is expanded to build a chamber 4, the cushioning materials 5 fall down from the upper space of the ceiling whereby the hollow space between the chamber 4 and all passengers is filled with expanded particles of the cushioning materials 5. As a result, passengers are protected from the influence of shocks.

Figure 7:
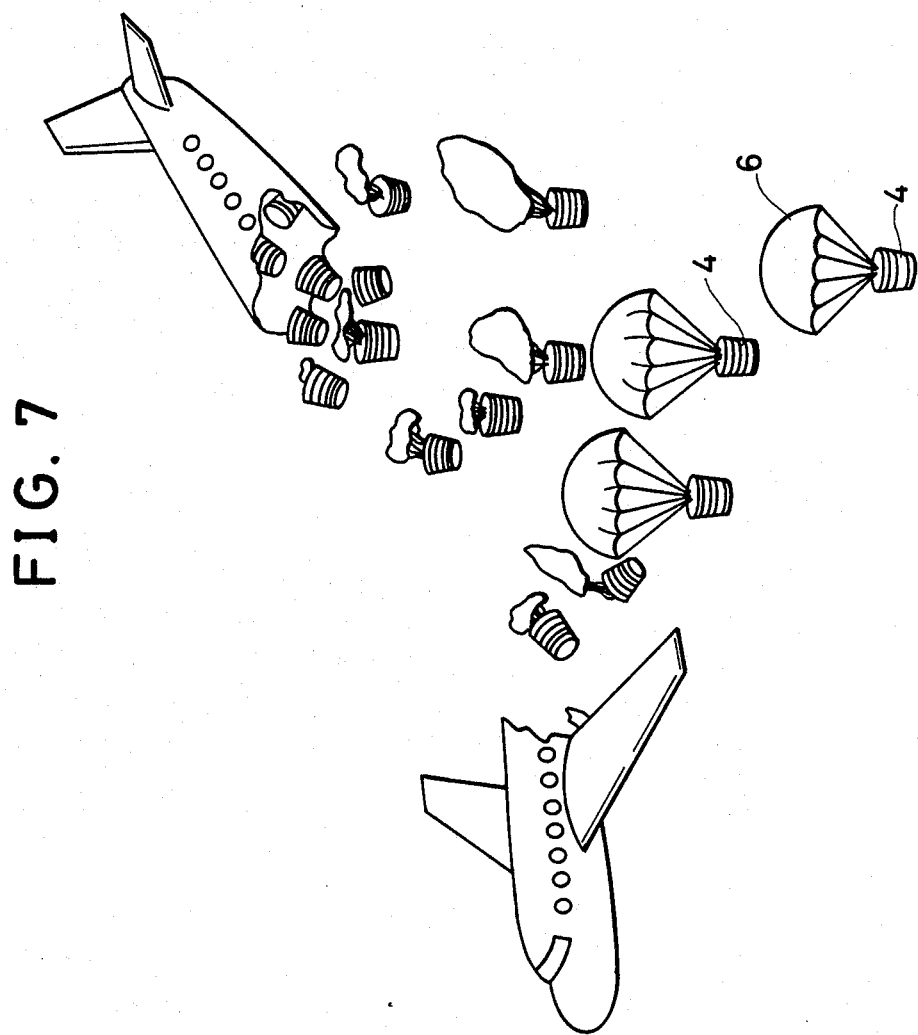
FIG. 7 illustrates that the body of the airplane is broken into two pieces and the safety chambers are successively thrown away therefrom while their parachute is unfolded and opened.
Figure 8:
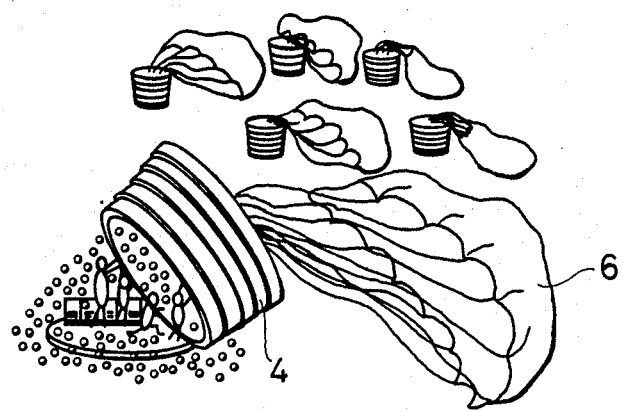
FIG. 8 illustrates that the safety chamber lands on the ground safely and passengers are tilting up to leave there.

Further, the safety chamber of the invention is provided with a parachute box (not shown) in which a parachute 6 is stored. In the event that the airplane is broken into two parts due to an occurrence of explosion or the like, a plurality of safety chambers of the invention are thrown away from the broken body of the airplane one after another in such a manner as shown in FIG. 7 while the parachutes 6 stored in the parachute boxes are successively unfolded and opened. Since the hollow space surrounding passengers in the safety chamber is filled with a large number of cushioning materials 5 in the expanded state, they are safely protected from the influence of shocks caused when the safety chamber lands on the ground or sea surface as shown in FIG. 8.

Obviously, the safety chamber of the invention is provided with locking means and switching means for assuring proper operation thereof but they are well known for any expert in the art and therefore their description will not be required.

While the present invention has been described above with a preferred embodiment thereof, it should of course be understood that it should not be limited only to this but various changes or modifications may be made in a suitable manner without any departure from the spirit and scope of the invention as defined by the appended claims.

What is claimed is:

1. A safety chamber of the telescopic type usable for an airplane comprising:

a plurality of wall segments adapted to be telescopically displaced relative to one another to assume a contracted state when the safety chamber is not in use and an expanded state when the safety chamber is in use, said wall segments constituting a chamber in the expanded state in which a single seat assembly is completely incased together with passengers sitting thereon in the event of an emergency, the lowermost wall segment having the same dimensions as those of the bottom of the seat assembly;

a large number of granular cushioning materials for protecting the passengers on the seat assembly from the influence of shock caused when such seat assembly lands on the ground or sea surface, said cushioning materials being stored in a compressed state in the contracted wall segments on the ceiling of the airplane when the safety chamber is not in use, said cushioning material falling down from the ceiling and expanding by themselves in the event of an emergency so that the hollow space in the expanded safety chamber surrounding all passengers being filled; and a parachute stored in a parachute box on the uppermost wall segment.

2. The safety chamber as claimed in claim 1, wherein the lowermost wall segment is provided with a plurality of engagement means along the bottom edge thereof which are engaged with the bottom of the seat assembly when the safety chamber is lowered to the floor of the airplane.

3. The safety chamber as claimed in claim 2, wherein each of said engagement means comprises a hook adapted to be engaged with a recessed part on the bottom of the seat assembly.

4. The safety chamber as claimed in claim 1, wherein each of the wall segments is appreciably tapered downwardly so as to inhibit it from being disconnected from the seat assembly.

5. A safety chamber as claimed in claim 1, wherein said cushioning materials are stored in the space in the contracted wall segments with the use of a film or the like material which is broken when said safety chamber is in use in the event of an emergency.

* * * * *